United States Patent [19]
Godshaw

[11] Patent Number: 6,155,206
[45] Date of Patent: Dec. 5, 2000

[54] ANIMAL TRAVEL BAG

[75] Inventor: Donald E. Godshaw, Evanston, Ill.

[73] Assignee: Travel Caddy, Inc., Des Plaines, Ill.

[21] Appl. No.: 09/216,307

[22] Filed: Dec. 18, 1998

[51] Int. Cl.[7] .................................................. A01K 1/00
[52] U.S. Cl. .......................................... 119/453; 119/496
[58] Field of Search ................................... 119/453, 496, 119/497, 500

[56] References Cited

U.S. PATENT DOCUMENTS

| 5,280,767 | 1/1994 | Goetz | 119/496 |
|---|---|---|---|
| 5,881,678 | 3/1999 | Morley | 119/496 |
| 5,931,120 | 8/1999 | Burns et al. | 119/497 |
| 5,941,195 | 8/1999 | Martz | 119/497 |
| 6,021,740 | 2/2000 | Martz | 119/496 X |

*Primary Examiner*—Robert P. Swiatek
*Attorney, Agent, or Firm*—Banner & Witcoff, Ltd.

[57] ABSTRACT

A small animal carrier is comprised of fabric formed in a rectangular parallelpiped shape with a collapsible wire metal cage positionable on support pads within the carrier. Recessed wheels are positioned on the bottom side of the carrier and are attached to a stiffening board which enhances the structural integrity of the carrier.

18 Claims, 4 Drawing Sheets

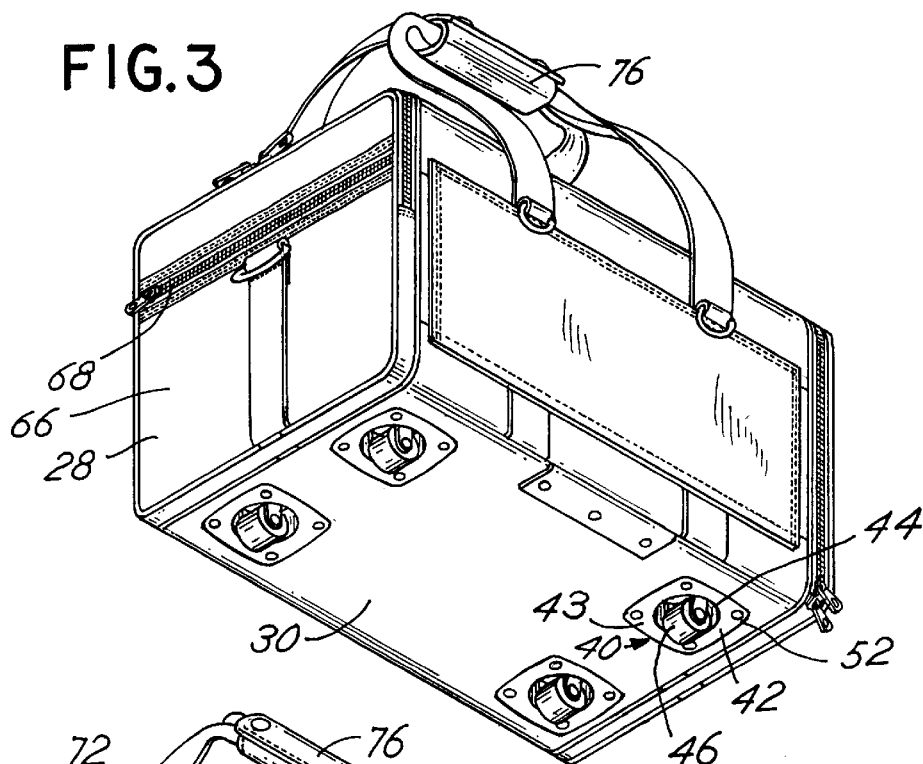
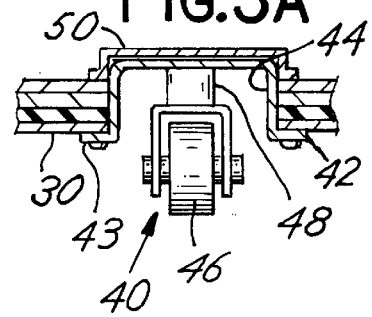
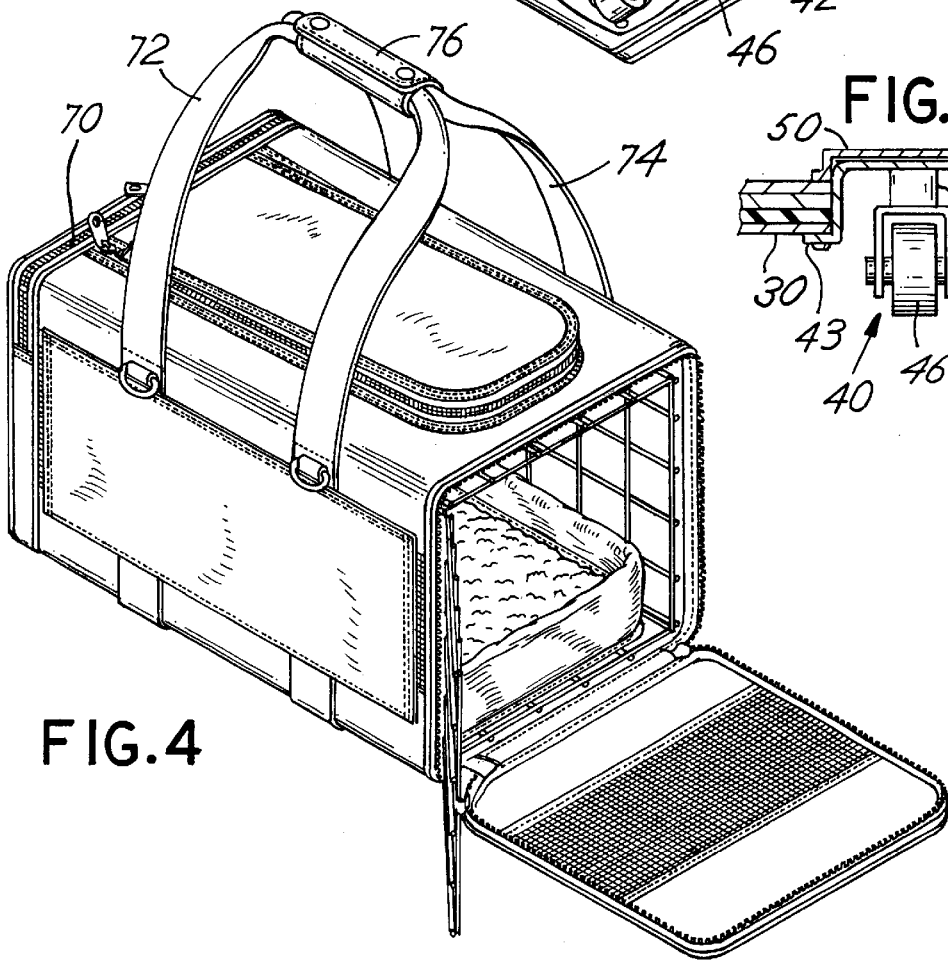

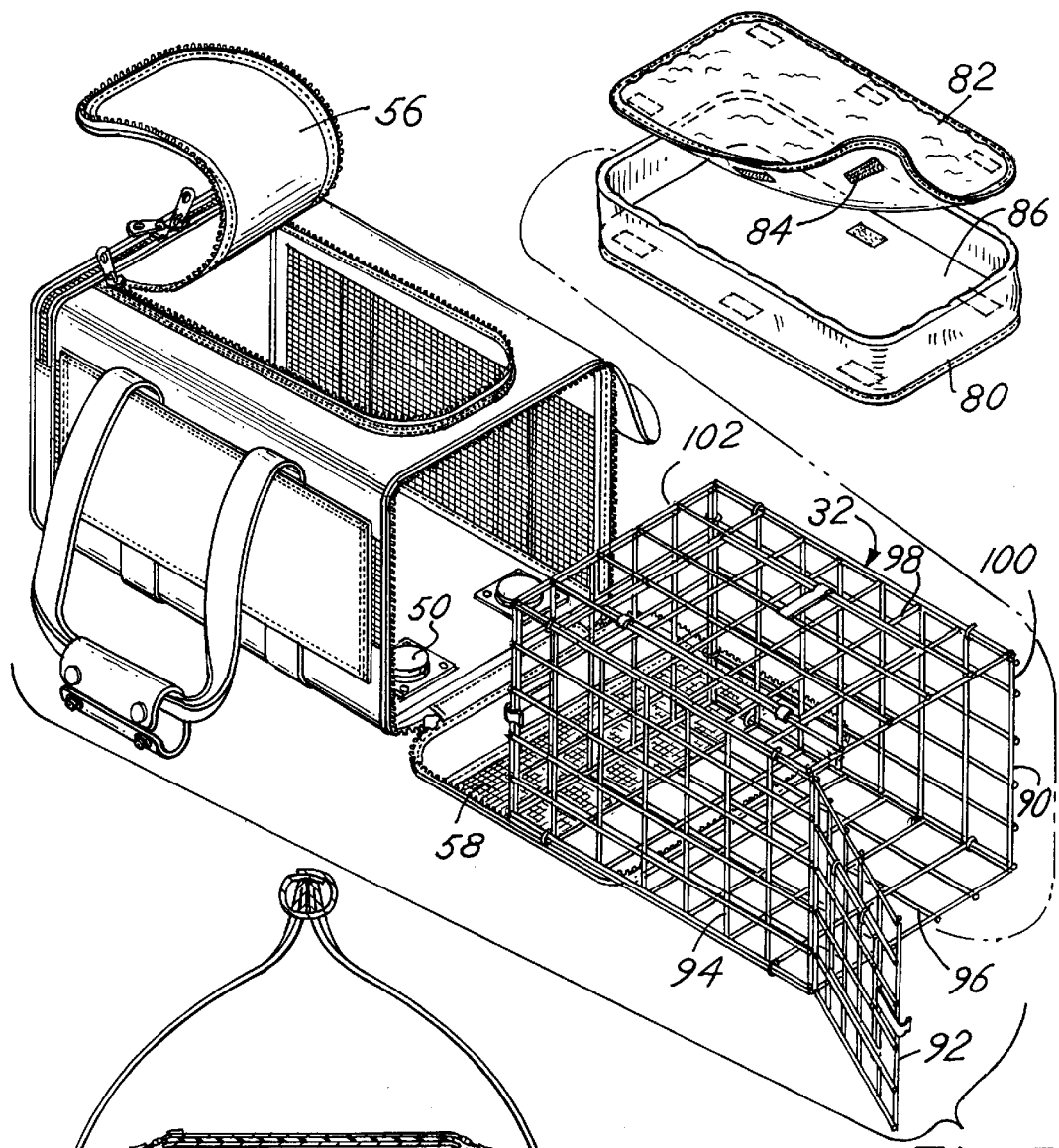
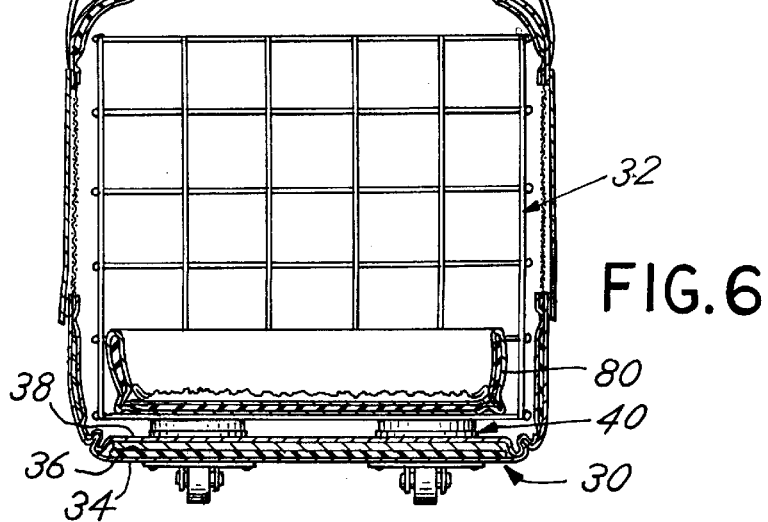
FIG.5
FIG.6

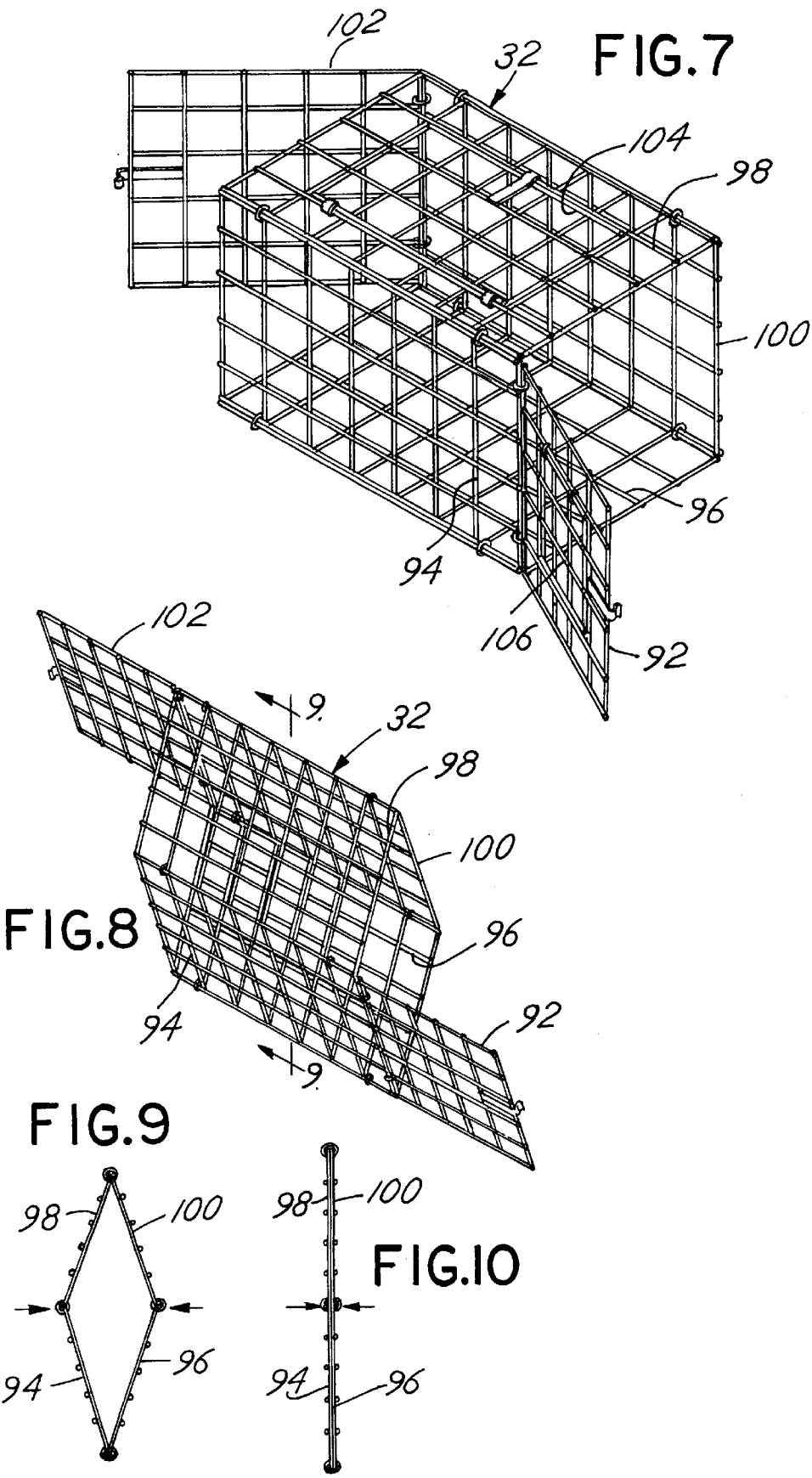

ANIMAL TRAVEL BAG

BACKGROUND OF THE INVENTION

This invention relates to a portable, small animal carrier.

People enjoy the companionship of pets, and to permit accompaniment of pets on trips, especially on airlines, a pet owner may carry small animals or pets in specially designed animal carriers sized for placement under the seat in front of the passenger. Such animal carriers are lightweight and easily portable. A very popular brand of such carriers is known by the trade name and trademark the SHERPA carrier. Such a carrier is made from a fabric or flexible material and has the general shape of a rectangular parallelpiped. Side or front and back panels are connected to the carrier by means of zippers for ease of access to the interior of the carrier. Certain sides of the carrier may include mesh fabric for air flow into and out of the carrier.

The popularity of such carriers is known. The carriers are particularly useful for small dogs and cats. Certain animals, however, are difficult to carry in such carriers, for example, birds, ferrets and animals with claws, because they may tear the carrier fabric and escape. Thus, there has developed a need for a more universal type small animal carrier. Such a need inspired the development of the present small animal carrier.

SUMMARY OF THE INVENTION

In a principal aspect the present invention comprises a small animal carrier in the form of a rectangular parallelpiped bag having a front access panel which is attached by means of a fastener, such as a zipper, for ease of ingress to and egress from the carrier. The carrier further includes a bottom side having a stiffener plate with a wheel positioned at each of the four corners of the bottom side with wheel wells including pads positioned on the inside of the bag for support of an animal tray. The carrier further includes an optional, internal, foldable metal cage. The cage may be utilized in combination with the carrier for animals such as birds which may otherwise tear or shred the sides of the carrier. Various other features include protective flaps, handles, additional access ports, a slidable tray, a foldable cage and other features.

Thus, it is an object of the invention to provide an improved small animal carrier.

It is a further object of the invention to provide a small animal carrier which has increased structural integrity thereby making it capable of being utilized in combination with wheels or rollers as well as with a small animal support tray on the interior of the bag.

Another object of the invention is to provide a small animal carrier which may be utilized in combination with the foldable metal cage.

Another object of the invention is to provide a small animal carrier which is rugged, economical, and easy to transport.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 3 is an isometric view illustrating the stiffening board and wheel construction of the bottom side of the small animal carrier;

FIG. 3A is an enlarged cross-section view of the wheel construction of the small animal carrier;

FIG. 4 is an isometric view of the small animal carrier wherein the front flap is opened and an optional foldable wire mesh carrier is inserted into the carrier with an animal carrier tray therein;

FIG. 5 is an exploded isometric view of the combination depicted in FIG. 4;

FIG. 6 is a side elevation cross sectional view taken along the line 6—6 in FIG. 1;

FIG. 7 is an isometric view of the foldable metal cage which may be used in combination with the small animal carrier;

FIG. 8 is an isometric view of the wire mesh cage of FIG. 7 in a partially folded condition;

FIG. 9 is a cross sectional view of the cage of FIG. 8 taken along the line 9—9; and FIG. 10 is a cross sectional view of the cage of FIG. 7 in a flap folded condition.

DESCRIPTION OF THE PREFERRED EMBODIMENT

Figure 1:
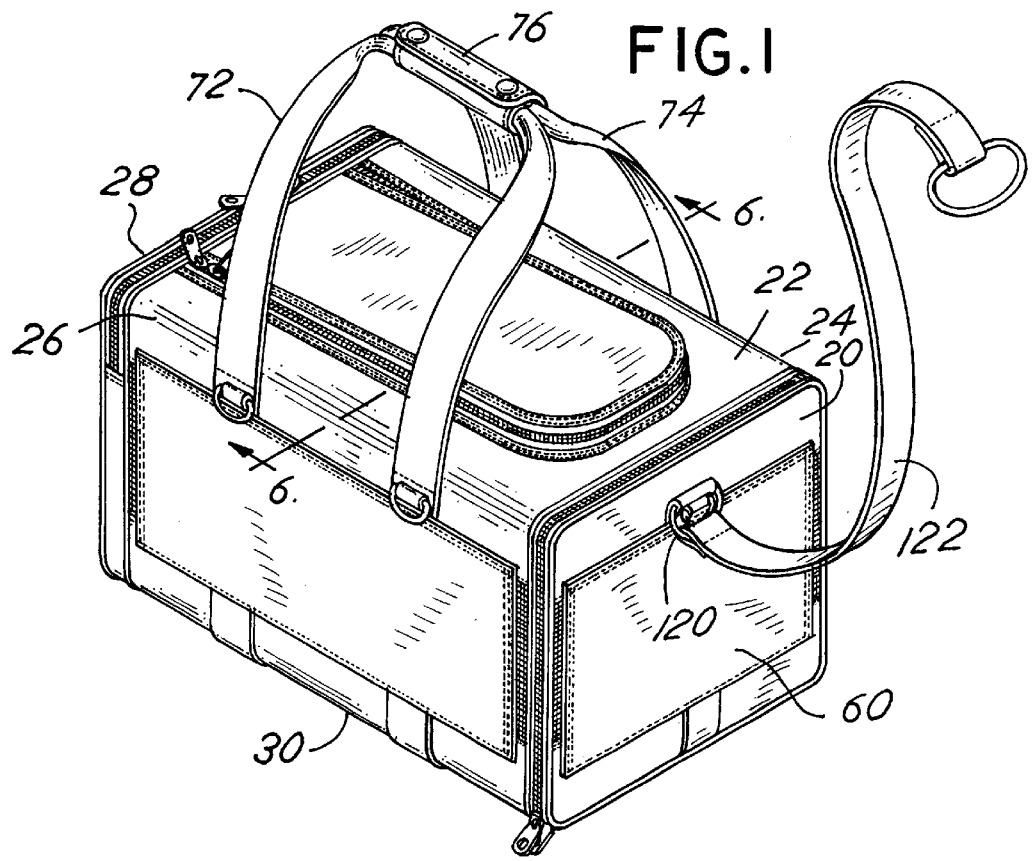
FIG. 1 is an isometric view of the small animal carrier of the invention wherein all of the side flaps are folded to the closed position.
Figure 2:
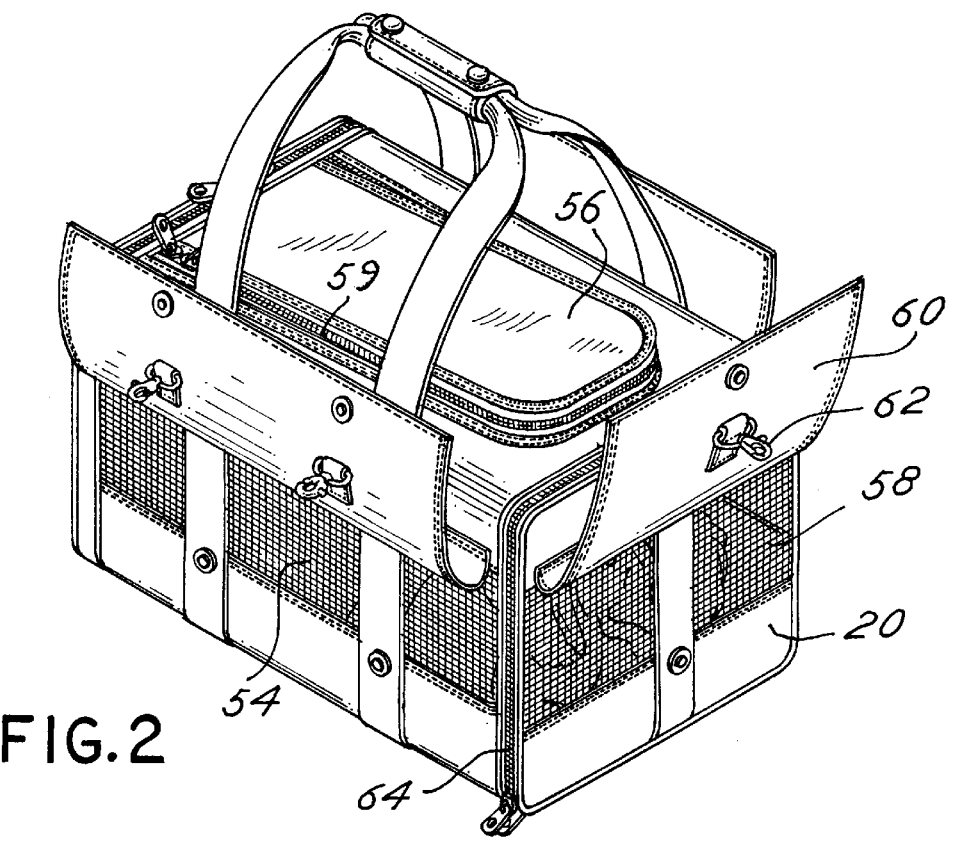
FIG. 2 is an isometric view of the small animal carrier of FIG. 1 wherein the side flaps of the carrier are in a raised position.

The small animal carrier includes a front side 20, a top side 22, a first lateral side 24, a second lateral side 26, a back side 28, and a bottom side 30. The sides 20, 22, 24, 26, 28, 30 are assembled in the form of a rectangular parallelpiped. The sides are generally made from a fabric or flexible material. Reinforcing wires or ribs may be integrated into the carrier especially at the intersection of any of the sides. Positioned within the interior of the carrier or bag is an optional foldable wire metal cage 32 as depicted in FIGS. 5 and 6.

The construction of the bottom side 30 is depicted in FIG. 6 and includes an outer fabric layer 34, an internal stiffening board or boards 36 and a protective top flexible layer 38. Positioned at each of the corners of the bottom side 30 is a wheel assembly 40. The wheel assembly 40 includes a support housing 42 which includes a recessed generally cylindrical opening 44 or wheel well 44 in which a caster wheel 46 is pivotally supported upon spindle assembly 48. The well 44 projects through an opening in the base or bottom side 30 and is retained by means of a generally cylindrical cap 50. Thus, the wheel assembly 42 is tightly retained in the bottom wall 30. Fasteners 52 attach an outer flange 43 of the wheel well 44 to the bottom side 30. The caps 50 or pads 50 serve multiple functions of protecting the top of the wheel well 44, holding the well 44 in position and also serve as a sliding support surface or pad for supporting either a small animal carrier tray or the wire cage 32.

The lateral sides 24 and 26 of the carrier constitute fabric extensions of the fabric forming the bottom side 30. The lateral sides 24, 26 include mesh sections such as mesh section 54 and connect together to define the top side 22. The top side 22 includes a flap 56 attached along one side and connected by means of a zipper 59 which may be unzipped for access to the interior of the carrier.

The front side wall 20 also includes a mesh section 58 with a protective cover flap 60 attachable by means of a fastener 62. A zipper 64 provides a means for fastening the front side 20 to the two lateral sides 24 and 26 and the top side 22. The back side 28 includes a pocket 66 which has ingress thereto by means of a zipper connection. A further zipper 70 fits across the top side 22 adjacent the intersection with the back side 28 of the carrier and provides means for access to the interior of the carrier.

Hand straps 72 and 74 are attached respectively to the bottom side 30 on opposite lateral sides 26, 28 of the carrier and extend upwardly along the lateral sides 26 and 24, respectively. The handles 72 and 74 may be connected by means of a detachable strap 76. This described construction of the straps 72, 74 helps provide enhanced rigidity and form to the animal carrier because the straps 72, 74 are made from a heavy gage material. Note that the straps 72 and 74 are preferably attached not only to the bottom, but to the sides 24 and 26 so as to enhance the structural integrity of the carrier or bag.

A tray 80 may be supported on top of the support pads 50 as depicted in FIG. 5. The tray 80 may include a cushion 82 which is held in position, for example, by Velcro fasteners 84. The tray 80 includes a flat generally rigid bottom plate 86. The plate 86 is designed to slide on the flat support pads 50 for ease of ingress and egress to the interior of the carrier.

An optional metal cage 32 is in the form of a generally rectangular parallelpiped cage. The cage 32 includes six sides which are hinged one to the other. Thus, a front side 92 is hinged to a lateral side 94. Lateral side 94 is hinged to a bottom side 96 and the top side 98 which, in turn, is hinged to another lateral side 100. The back side 102 is hinged to side 100 in the same manner as the front side 92. Optional access doors such as door 104 in top side 98 and door 106 in front side 92 may be provided for ingress and egress to the cage 32. The cage 32 may be folded in the manner depicted in FIGS. 8, 9 and 10. Thus, as depicted in FIG. 8, the four lateral sides 94, 96, 98, 100 may be folded flat to the configuration of FIG. 10 and the front side 92 and back side 102 may be folded back over the lateral sides to form a flat cage construction which is easily stored, but which may be formed or assembled as depicted in FIG. 5 for sliding into and out of the carrier.

As noted in FIG. 6, the cage 32 is typically positioned within the carrier or bag with the small animal tray 80 positioned within the cage 32. Note again that the pads 50 support the cage 32 and facilitate its sliding movement into and out of the carrier.

It is possible to vary certain features of the invention without parting from the spirit and scope of the invention. Protective side flaps may be included in the back side 22, for example. The zipper 70 and associated with the back side 22 may be eliminated or may be provided to permit total outward folding of the back side 22. The shape of the top flap 56 may be varied. The size of the mesh and the configuration and size of the mesh for the wire cage 32 may be varied. A strap for pulling the carrier may be attached to the ring 120 as shown in FIG. 1. This will permit pulling the carrier on the ground. The height and dimension of the carrier may be devised to accommodate various types of animals and various sizes of animals. The strength and rigidity of the bottom side 30 is enhanced by the stiffening board or boards, however, other means may be utilized. Thus, while there has been set forth a preferred embodiment of the invention, it is to be understood the invention is limited only by the following claims and their equivalents.

What is claimed is:

1. A small animal carrier comprising, in combination:
    a rectangular, parallelpiped bag having a top side, a bottom side, a back end side, a front end side, and opposed, spaced lateral sides, at least one of the lateral and front sides including screen sections, said front end side including a fastener for attaching edges of the front side to the adjacent top and lateral sides, said front side being attached to an adjacent side by a flexible hinge, whereby the front side may be pivoted to expose the interior of the bag;
    handle straps attached to the bag;
    said bottom side including wheels for support thereof, each of said wheels attached to the bottom side by a mounting bracket; and
    a rectangular parallelpiped shaped screen cage fitted within the bag.

2. The carrier of claim 1 wherein the bag is comprised of flexible material and including stiffening members for at least selected edges of the rectangular parallelpiped bag.

3. The carrier of claim 1 including screen sections in the lateral sides and front side.

4. The carrier of claim 1 including a flap in the top side having a side flexibly joined to the back side and including at least two sides attached by a fastener to the top side to permit opening of the flap and access to the interior of the bag.

5. The carrier of claim 1 further including a generally rectangular animal support tray slidably mounted in the bag and removable through the opening defined by the front side.

6. The combination carrier and cage of claim 1 further including an animal support tray within the screen cage.

7. The combination of claim 1 wherein the cage is foldable.

8. The combination of claim 1 wherein the cage includes at least one hinged door positioned adjacent the front side.

9. The combination of claim 1 wherein the cage includes an interior animal support tray with a removable cushion.

10. The carrier of claim 1 including four wheels, each wheel mounted in a well arranged at corner of a rectangle defined in the bottom side, said wells each including a support pad on the inside of the bag.

11. The carrier of claim 1 wherein the bottom side has a rigid, planar support member.

12. The combination of claim 1 wherein the cage is foldable into a planar form, and said cage includes four planar sides connected together at parallel edges and two planar end sides connected at one edge to a planar side.

13. The carrier of claim 1 wherein the back side includes a fastener for detaching at least a portion of the back side from the top side and lateral sides.

14. The carrier of claim 1 further including a pocket in the back side.

15. The carrier of claim 1 including fasteners for the flaps for retaining the flaps in a closed position.

16. A small animal carrier comprising, in combination:
    a rectangular, parallelpiped bag having flexible material sides and a frame forming the bag; said bag including a bottom side having a congruent, reinforced stiffening plate;
    a plurality of wheel housings in the bottom side, each wheel housing including a wheel on the outside of the bottom side for supporting the bag and further including a support pad on the inside on the bag;
    said bag having a detachable side for ingress to the bag; and
    a screen cage fitted within the bag.

17. A small animal carrier comprising, in combination:
    a generally rectangular, parallelpiped bag having flexible material sides and a frame forming the bag, said bag including a bottom side having a congruent, reinforcing, stiffening plate; and a plurality of wheel housings affixed to the bottom side, each wheel housing including a wheel well on the outside of the bottom side, said housing recessed into the bottom side and projecting into the interior of the bag for receiving a wheel and further including a support pad on the inside of the bag in the form of a cap over the wheel housing to provide a support surface within the bag, each of said support pads positioned adjacent the corners of the bottom side and exposed on the inside of the bag to support an animal carrier.

18. The carrier of claim 17 further including a screen cage fitted within the bag and supported on the support pads.

* * * * *